US010631316B1

(12) United States Patent
Oroskar et al.

(10) Patent No.: US 10,631,316 B1
(45) Date of Patent: Apr. 21, 2020

(54) SYSTEMS AND METHODS FOR ADJUSTING A SCHEDULING ALGORITHM BASED ON WIRELESS DEVICE PRIORITY

(71) Applicant: Sprint Spectrum LP, Overland Park, KS (US)

(72) Inventors: Siddharth Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 187 days.

(21) Appl. No.: 14/963,732

(22) Filed: Dec. 9, 2015

(51) Int. Cl.
*H04W 72/12* (2009.01)

(52) U.S. Cl.
CPC ... *H04W 72/1247* (2013.01); *H04W 72/1231* (2013.01)

(58) Field of Classification Search
None
See application file for complete search history.

(56) References Cited

U.S. PATENT DOCUMENTS

| | | | | |
|---|---|---|---|---|
| 6,775,231 | B1 * | 8/2004 | Baker | H04L 47/10 370/230.1 |
| 7,835,394 | B2 | 11/2010 | Ishii | |
| 7,869,403 | B2 | 1/2011 | Lee et al. | |
| 8,311,002 | B2 | 11/2012 | Nyberg et al. | |
| 8,792,439 | B2 | 7/2014 | Kahn et al. | |
| 2010/0091724 | A1 * | 4/2010 | Ishii | H04W 52/32 370/329 |
| 2012/0157147 | A1 * | 6/2012 | Christoffersson | H04L 1/0019 455/517 |
| 2014/0254370 | A1 * | 9/2014 | Kakadia | H04W 28/0268 370/235 |
| 2015/0092704 | A1 * | 4/2015 | Chen | H04W 72/1231 370/329 |
| 2015/0351106 | A1 * | 12/2015 | Wijetunge | H04W 72/1226 370/329 |
| 2017/0034750 | A1 * | 2/2017 | Tamura | H04W 48/10 |
| 2017/0164386 | A1 * | 6/2017 | Fu | H04W 72/10 |

* cited by examiner

*Primary Examiner* — Jeffrey M Rutkowski
*Assistant Examiner* — Mehedi S Aley

(57) ABSTRACT

Systems and methods are described for adjusting a scheduling algorithm based on wireless device priority. A plurality of resource blocks may be transmitted from an access node to a set of wireless devices using a scheduling algorithm, wherein the set comprises a first priority subset of wireless devices and a second priority subset of wireless devices. It may be detected that a number of resources blocks received by the second priority subset of wireless devices is greater than a number of resource blocks received by the first priority subset of wireless devices. And, based on the detecting, the scheduling algorithm may be adjusted such that the resource blocks received by the first priority subset of wireless devices are increased after the adjustment.

20 Claims, 6 Drawing Sheets

SYSTEMS AND METHODS FOR ADJUSTING A SCHEDULING ALGORITHM BASED ON WIRELESS DEVICE PRIORITY

TECHNICAL BACKGROUND

Telecommunication systems, such as cellular networks or other wireless networks, rely on multiple network elements to provide reliable services. For example, one or more access points (e.g., access nodes) may be located in a given geographic space to provide coverage over the space. Wireless devices serviced by an access node may be scheduled wireless transmissions based on a scheduling algorithm, and some scheduling algorithms may consider channel conditions when scheduling such transmissions. However, channel conditions for serviced wireless devices may at times cause a scheduling algorithm to favorably schedule resources for wireless devices with a relatively low priority (e.g., relative to other wireless devices with a higher priority). A system that effectively adjusts a scheduling algorithm used by an access node when certain conditions are present can provide enhanced service to users of the system.

Overview

Systems and methods are described for adjusting a scheduling algorithm based on wireless device priority. A plurality of resource blocks may be transmitted from an access node to a set of wireless devices using a scheduling algorithm, wherein the set comprises a first priority subset of wireless devices and a second priority subset of wireless devices. It may be detected that a number of resources blocks received by the second priority subset of wireless devices is greater than a number of resource blocks received by the first priority subset of wireless devices. And, based on the detecting, the scheduling algorithm may be adjusted such that the resource blocks received by the first priority subset of wireless devices are increased after the adjustment.

DETAILED DESCRIPTION

Systems and methods are described for adjusting a scheduling algorithm based on wireless device priority. For example, a scheduling algorithm, such a proportional fairness scheduling algorithm, may be used to transmit resourced blocks from an access node to a set of wireless devices. The set may include a first priority subset and a second priority subset of wireless devices. For example, the first priority subset may be labeled as normal users while the second priority subset may be labeled as heavy users (e.g., heavy user label may be based on data consumption over a period of time).

In some embodiments, the first priority subset of wireless devices may be prioritized over the second priority subset of wireless devices such that the first priority subset, under normal conditions, comprises favorable scheduling for resource block transmissions. However, based on certain conditions (e.g., channel conditions, QCIs, and the like), it may be determined that the first priority subset of wireless devices (e.g., normal users) are not being appropriately prioritized over the second priority subset of wireless devices (e.g., heavy users). For instance, the second priority subset of wireless devices may be located near the serving access node while the first priority subset of wireless devices may be located at the cell edge, and thus a scheduling algorithm, such as a proportional fairness scheduling algorithm, may schedule resource block transmissions to the second priority subset of wireless devices more readily than to the first priority subset of wireless devices. In such conditions, it may be advantageous to adjust the scheduling algorithm used by the serving access node to mitigate against the second priority subset of wireless devices being scheduled resource block transmissions more favorably than the first priority subset of wireless devices.

Figure 1:
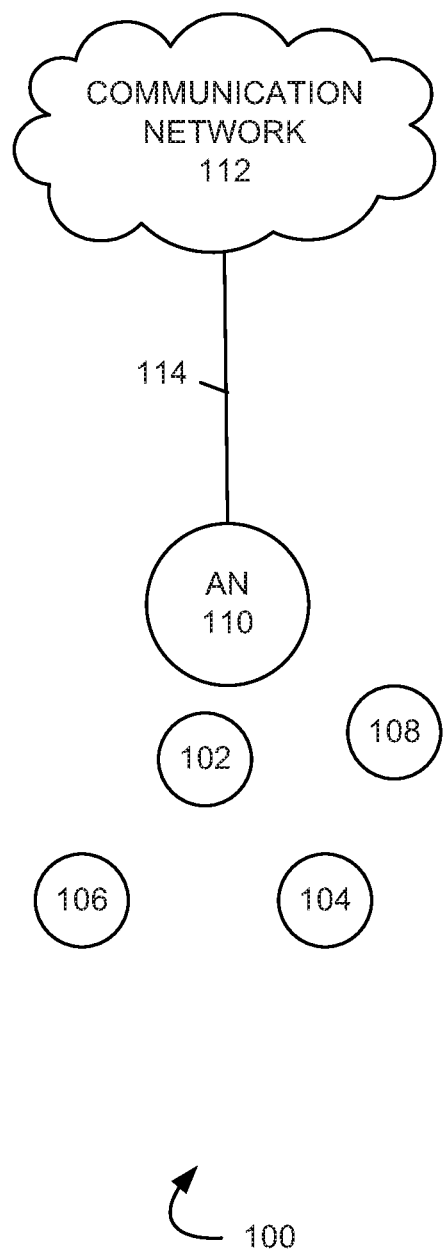
FIG. 1 illustrates an exemplary communication system to adjust a scheduling algorithm based on wireless device priority.

FIG. 1 illustrates an exemplary communication system 100 to adjust a scheduling algorithm based on wireless device priority comprising wireless devices 102, 104, 106, and 108, access node 110, communication network 112, and communication link 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 110 and communication network 112 which are omitted for clarity, including additional processing nodes, routers, gateways, and physical and/or wireless data links for carrying data among the various network elements.

Wireless devices 102, 104, 106, and 108 can be any device configured to communicate over communication system 100 using a wireless communication link. For example, wireless devices 102, 104, 106, and 108 can include a cell phone, a smart phone, a computing platform such as a laptop, palmtop, or a tablet, a personal digital assistant, or an internet access device, and combinations thereof. It is noted that while the wireless devices are illustrated in FIG. 1 as being in communication with the depicted access node, any number of access nodes can be implemented.

Access node 110 is a network node capable of providing wireless communications to wireless devices 102, 104, 106, and 108, and can be, for example, a base transceiver station, a radio base station, and an eNodeB device. Access node 110 may communicate with communication network 112 over communication links 114. Although only one access node is illustrated in FIG. 1, wireless device 102 (and other wireless devices) can be in communication with a plurality of access nodes and/or small cells. The plurality of access nodes and/or small cells can be associated with different networks and can support different communication protocols and radio access technologies.

Communication network 112 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 may also comprise a wireless network, including base stations, wireless communication nodes, telephony switches, internet routers, network gateways, computer systems, communication links, or some other type of communication equipment, and combinations thereof.

Communication link 114 can be a wired or wireless communication link. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 110 may establish communication with wireless devices 102, 104, 106, and 108 such that access node 110 provides the wireless devices access to a communication network (e.g., communication network 112). In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a set of wireless devices 102, 104, 106, and 108 may comprise two different subsets. For example, wireless devices 104 and 106 may comprise a first priority subset while wireless devices 102 and 108 may comprise a second priority subset. Access node 110 may schedule resource blocks transmissions to the set of wireless devices, where the first priority subset of wireless devices are prioritized over the second priority subset of wireless devices for scheduled resource block transmissions. In an example, the first priority subset of wireless devices may comprise normal users while the second priority subset of wireless devices may comprise heavy users (e.g., heavy user label may be based on data consumption over a period of time).

Under normal conditions, a scheduling algorithm, such as proportional fairness, may be used by access node 110 such that resource block transmissions may be scheduled favorably for the first priority subset of users. However, in some conditions (e.g., channel conditions, QCIs, and the like) the scheduling algorithm may schedule resource transmissions for the second priority subset of users more favorably than for the first priority subset of users (e.g., the second priority subset of wireless devices may receive, on average, more resource blocks transmissions than the first priority subset of wireless devices). It may be beneficial to detect such conditions and adjust the executed scheduling algorithm to mitigate against the second priority subset of wireless devices being scheduled resource block transmissions more favorably than the first priority subset of wireless devices.

Figure 2:
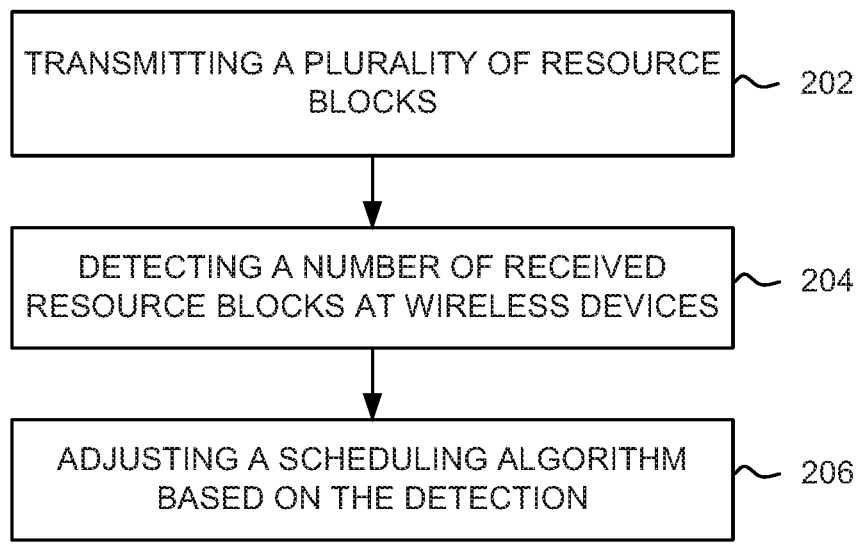
FIG. 2 illustrates an exemplary method for adjusting a scheduling algorithm based on wireless device priority.

FIG. 2 illustrates an exemplary method for adjusting a scheduling algorithm based on wireless device priority according to an embodiment. The method will be discussed with reference to the exemplary communication system 100 illustrated in FIG. 1, however, the method can be implemented with any suitable communication system.

Referring to FIG. 2, at step 202, a plurality of resource blocks may be transmitted from an access node to a set of wireless devices using a scheduling algorithm, wherein the set comprises a first priority subset of wireless devices and a second priority subset of wireless devices. For example, access node 110 may wirelessly transmit resource blocks to the set of wireless devices 102, 104, 106, and 108 using a first scheduling algorithm, such as a proportional fairness algorithm. In an embodiment, wireless devices 104 and 106 may comprise a first priority subset while wireless devices 102 and 108 may comprise a second priority subset. For example, subset priority may indicate which subset is to be favored when scheduling resource block transmissions, and the subsets may be divided based on data consumption over time, user account priority (e.g., registered service level), time of day/week/month, and any other suitable criteria.

At step 204, it may be detected that a number of resources blocks received by the second priority subset of wireless devices is greater than a number of resource blocks received by the first priority subset of wireless devices. For example, it may be detected that wireless devices 102 and 108 are receiving a greater number of resource block transmissions than wireless devices 104 and 106. The greater number may comprise an average number of resource blocks (e.g., average per wireless device), a total number of resource blocks (e.g., based on the sum of resource blocks received by each wireless device among a subset), or any other suitable number.

In an embodiment, the detection may be based on conditions detected for access node 110 and wireless devices 102, 104, 106, and 108 rather than an actual calculation of received blocks at each wireless device, as further detailed herein. Thus, the detection may comprise an estimate based on conditions for access node 100 and wireless devices 102, 104, 106, and 108. In another embodiment, the detection may be based on a calculation of transmitted blocks to each wireless device from access node 110 over a period of time.

At step 206, based on the detecting, the scheduling algorithm may be adjusted such that the resource blocks received by the first priority subset of wireless devices are increased after the adjustment. For example, the scheduling algorithm at access node 110 may be adjusted from a first scheduling algorithm (e.g., proportional fairness scheduling algorithm) to a second scheduling algorithm (e.g., round robin scheduling algorithm). In an embodiment, when adjusting from proportional fairness to round robin, scheduling is no longer based on channel conditions for wireless devices 102, 104, 106, and 108. Thus, with a round robin scheduling algorithm, the first priority subset of wireless devices are scheduled at least as many wireless resource block transmissions as the second priority subset of wireless devices based on average per wireless device. In other embodiments, the first and second scheduling algorithms may be different such that adjusting from the first scheduling algorithm to the second scheduling algorithm increases the number of resource blocks scheduled for transmission to the first priority subset of wireless devices.

Figure 3:
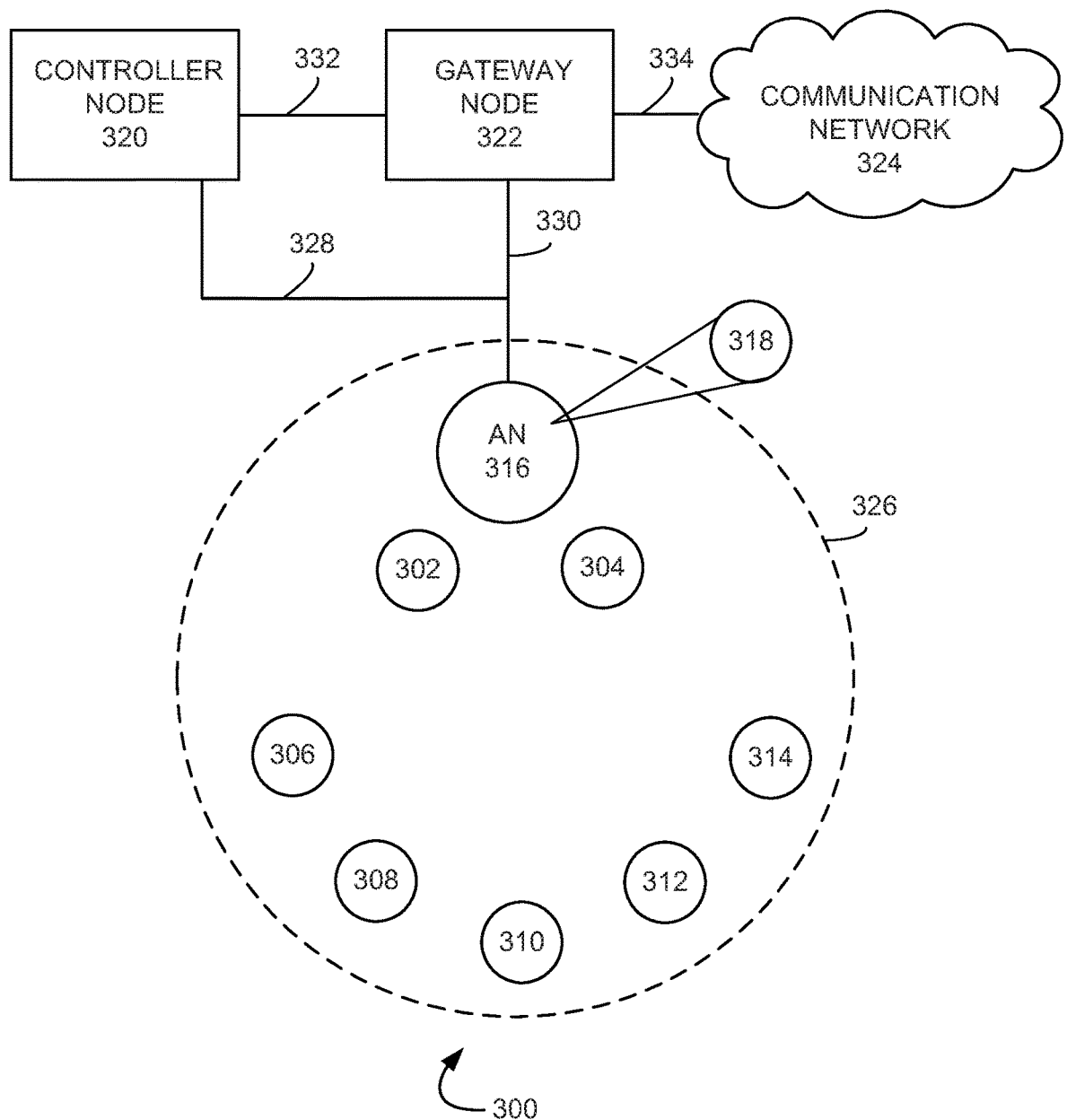
FIG. 3 illustrates another exemplary communication system to adjust a scheduling algorithm based on wireless device priority.

FIG. 3 illustrates another exemplary communication system 300 to adjust a scheduling algorithm based on wireless device priority. Communication system 300 may comprise wireless devices 302, 304, 306, 308, 310, 312, and 314, access node 316, scheduler 318, controller node 320, gateway node 322, communication network 324, coverage area 326, and communication links 328, 330, 332, and 334. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, 306, 308, 310, 312, and 314 can be any device configured to communicate over communication system 300 using a wireless communication link. For example, wireless devices 302, 304, 306, 308, 310, 312, and 314 can include a cell phone, a smart phone, a computing platform such as a laptop, palmtop, or a tablet, a personal digital assistant, or an internet access device, and combinations thereof.

Access node 316 is a network node capable of providing wireless communications to wireless devices 302, 304, 306, 308, 310, 312, and 314, and can be, for example, a base transceiver station, a radio base station, or an eNodeB device. In an embodiment, access node 316 can comprise a serving access node for one or more of wireless devices 302, 304, 306, 308, 310, 312, and 314. Access node 316 may communicate with controller node 320 over communication link 328, and with gateway node 322 over communication link 330. Access node 316 may comprise scheduler 318 that schedules wireless transmissions for wireless devices 302, 304, 306, 308, 310, 312, and 314. Scheduler 318 may comprise hardware and associated circuitry or software implementing computer code to perform scheduling functions. Additional access nodes may also be implemented that are not depicted in FIG. 3.

Controller node 320 can be any network node configured to manage services within system 300. Controller node 320 may provide other control and management functions for system 300. The controller node 320 can be a single device having various functions or a plurality of devices having differing functions. For example, controller node 320 can include at least one of a multi-cell/multicast coordination entity (MCE), a mobility management entity (MME), a radio network controller (RNC), a mobile switching center (MSC), and a combination thereof.

Controller node 320 can comprise a processor and associated circuitry to execute or direct the execution of computer-readable instructions to obtain information. Controller node 320 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 320 can receive instructions and other input at a user interface. Controller node 320 can comprise a processor and associated circuitry to execute or direct the execution of computer-readable instructions to obtain information.

Gateway node 322 is a network element which can comprise a processor and associated circuitry to execute or direct the execution of computer-readable instructions. Gateway node 322 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 322 can provide instructions to access node 316 related to channel selection in communications with the wireless devices. For example, gateway node 322 can comprise at least one of a serving gateway (SGW), a packet data network gateway (PDNGW), a cellular gateway (CGW), and a combination thereof.

Communication network 324 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 324 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 324 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 328, 330, 332, and 334 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 316, controller node 320, gateway node 322, and communication network 324 which are omitted for clarity, including additional processing nodes, routers, gateways, and physical and/or wireless data links for carrying data among the various network elements. In an embodiment, any of controller node 320, gateway node 322, and one or more modules of access node 316, may perform all or parts of the methods of FIGS. 2, 4, and 5.

In operation, access node 316 may establish communication with wireless devices 302, 304, 306, 308, 310, 312, and 316 such that access node 316 provides the wireless devices access to a communication network (e.g., communication network 322). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band. Access node 310 may also comprise a signal area 326. In an embodiment, a signal area may comprise the area around an access node where a wireless device may detect wireless signals transmitted from the access node (e.g., detect signals at a signal level above a threshold). The signal area may be a coverage area or any other suitable term known to one of ordinary skill in the art.

In an embodiment, a set of wireless devices 302, 304, 306, 308, 310, 312, and 314 may comprise two different subsets. For example, wireless devices 306, 308, 310, 312, and 314 may comprise a first priority subset while wireless devices 302 and 304 may comprise a second priority subset. Access node 316 may schedule resource blocks transmissions to the set of wireless devices, where the first priority subset of wireless devices are prioritized over the second priority subset of wireless devices. In an example, the first priority subset of wireless devices may comprise normal users while the second priority subset of wireless devices may comprise heavy users (e.g., heavy user label may be based on data consumption over a period of time).

Under normal conditions, a scheduling algorithm, such as proportional fairness, may be used by access node 316 such that resource block transmissions may be scheduled favorably for the first priority subset of users. However, in some conditions (e.g., channel conditions, QCIs, and the like) the scheduling algorithm may schedule resource transmissions for the second priority subset of wireless devices more favorably than for the first priority subset of wireless devices (e.g., the second priority subset of wireless devices may receive, on average, more resource blocks transmissions than the first priority subset of wireless devices). It may be beneficial to detect such conditions and adjust the scheduling algorithm to mitigate against the second priority subset of wireless devices being scheduled resource block transmissions more favorably than the first priority subset of wireless devices.

Figure 4:
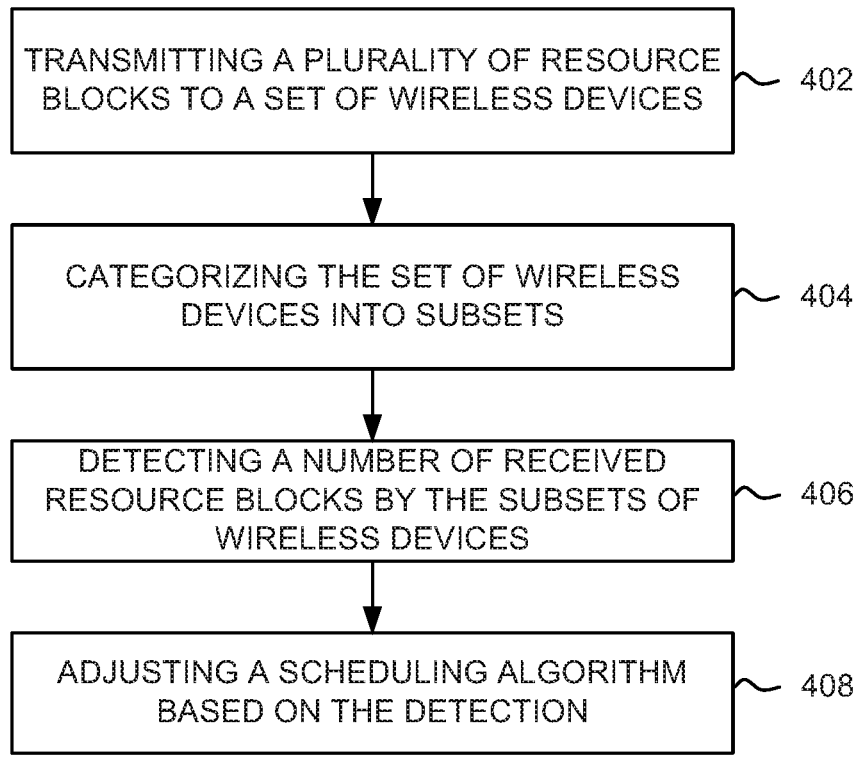
FIG. 4 illustrates another exemplary method for adjusting a scheduling algorithm based on wireless device priority.

FIG. 4 illustrates an exemplary method for adjusting a scheduling algorithm based on wireless device priority according to an embodiment. The method will be discussed with reference to the exemplary communication system 300 illustrated in FIG. 3, however, the method can be implemented with any suitable communication system.

Referring to FIG. 4, at step 402, a plurality of resource blocks may be transmitted from an access node to a set of wireless devices using a scheduling algorithm. For example, access node 316 may wirelessly transmit resource blocks to the set of wireless devices 302, 304, 306, 308, 310, 312, and 314 using a first scheduling algorithm, such as a proportional fairness algorithm or a C/I algorithm. In an embodiment, scheduler 318 may execute the first scheduling algorithm in order to schedule the wireless transmissions to the set of wireless devices.

In an embodiment, a scheduling algorithm may be used to determine which of the set of wireless devices is to be scheduled a next wireless transmission from access node 316. Scheduling algorithms may be a function of varying conditions, and thus can provide differing service to the set of wireless devices. For example, a round robin scheduling algorithm may be designed to schedule resource blocks transmissions evenly (e.g., fairly), and thus may be configured to distribute resource blocks evenly among the set of wireless devices. A max C/I scheduling algorithm may be designed to leverage channel conditions to achieve optimal spectrum efficiency, and thus may be configured to schedule the next resource block to a wireless device that comprises a high reported channel quality indicator (CQI) or positive channel conditions. A proportional fairness scheduling algorithm may weigh both even distribution and spectrum efficiency, thus comprising a hybrid algorithm that may be configured to schedule the next resource block to a wireless device based on fairness (e.g., akin to the round robin algorithm) and spectrum efficiency (e.g., akin to the C/I scheduling algorithm).

In an example, a proportional fairness algorithm may calculate, for each wireless device in communication with an access node, k such that k=arg max $r_i(t)/R_i(t)$. Here, $R_i(t)$ may comprise an average data rate for wireless device i over a time window, and $r_i(t)$ may comprise an instantaneous data rate (e.g., average instantaneous data rate) for wireless device i. Accordingly, the proportional fairness algorithm may then schedule a transmission for the wireless device that comprises the greatest k value. In some embodiments, other scheduling algorithms and other variants of a proportional fairness scheduling algorithm may be implemented.

In some embodiments, scheduler 318 may schedule wireless transmissions for one or more sectors of access node 316. For example, access node 316 may comprise a plurality of cells or sectors (e.g., three 120° arch sectors, or the like) and scheduler 318 may schedule transmissions for one or more of the cells or sectors.

At step 404, the set of wireless devices may be categorized into priority subsets. For example, the set of wireless devices may be categorized into a first priority subset and a second priority subset. In an embodiment, the subset priority may indicate which subset is to be favored when scheduling resource block transmissions. The subsets may be categorized based on data consumption over time, user account priority (e.g., registered service level), time of day/week/month, and any other suitable criteria. For example, data consumption for a wireless device may be monitored over a period of time (e.g., for billing purposes), and wireless devices that meet a criteria (e.g., exceed a threshold) may be categorized as heavy data users and thus may be assigned to the second priority subset. The categorization may be temporary (e.g., wireless devices may be assigned to the second priority subset on a monthly basis when they exceed a monthly data threshold). In an embodiment, wireless devices that do not meet the criteria (e.g., do not exceed the threshold) may be categorized as normal users and thus may be assigned to the first priority subset.

In another example, the set of wireless devices may be categorized into priority subsets based on a registered account associated with each wireless device. For example, a first registered account may include a premium service package while a second registered account may include a regular service package. Here, the wireless device associated with the first registered account may be assigned to the first priority subset while the wireless device associated with the second registered account may be assigned to the second priority subset. In another example, a first wireless service provider may be prioritized over a second wireless service provide. In this example, a wireless device associated with the first wireless service provided may be assigned to the first priority subset while the wireless device associated with the second wireless service provide may be assigned to the second priority subset. A wireless service provider may be a company that contracts with a user of a wireless device to provide wireless services, a company that collects payments from the user of the wireless device, a company that stores a registered account associated with the user of the wireless device (e.g., service account), and the like.

In some embodiments, the categorization into a plurality of subsets may be per cell or sector of an access node. For example, access node 316 may comprise a plurality of cells or sectors (e.g., three 120° arch sectors, or the like) and the set of wireless devices and subsequent subsets of wireless devices may be served by a cell or sector of an access node.

In an embodiment, wireless devices 306, 308, 310, 312, and 314 may comprise a first priority subset while wireless devices 302 and 304 may comprise a second priority subset. For example, wireless devices 306, 308, 310, 312, and 314 may comprise normal users while wireless devices 302 and 304 may comprise heavy users (e.g., based on data consumption over a period of time). Other embodiments may implement other suitable categorization criteria for assigning priority subsets to the set of wireless devices 302, 304, 306, 308, 310, 312, and 314.

At step 406, it may be detected that a number of resources blocks received by the second priority subset of wireless devices is greater than a number of resource blocks received by the first priority subset of wireless devices. For example, it may be detected that wireless devices 302 and 304 are receiving a greater number of resource block transmissions than wireless devices 306, 308, 310, 312, and 314 (e.g., over a period of time, such as a predetermined period of time). The greater number may comprise an average greater number of resource blocks (e.g., average per wireless device), a total greater number of resource blocks (e.g., based on the sum of resource blocks received by each wireless device among a subset), or any other suitable number.

In an embodiment, the detection may be based on conditions detected for access node 316 and wireless devices 302, 304, 306, 308, 310, 312, and 314 rather than an actual calculation of received blocks at each wireless device. In this example, the detection may comprise an estimate based on conditions for access node 316 and the set of wireless devices. In another embodiment, the detection may be based on a calculation of transmitted blocks to each wireless device from access node 316 over a period of time. The method of FIG. 5 further details how it is detected that the number of resources blocks received by the second priority subset of wireless devices is greater than the number of resource blocks received by the first priority subset of wireless devices.

At step 408, based on the detecting, the scheduling algorithm may be adjusted such that the resource blocks received by the first priority subset of wireless devices are increased after the adjustment. In an embodiment, the scheduling algorithm executed by scheduler 318 may be adjusted from a first scheduling algorithm (e.g., proportional fairness scheduling algorithm or C/I max scheduling algorithm) to a second scheduling algorithm (e.g., round robin scheduling algorithm). In an embodiment, when adjusting from proportional fairness to round robin, scheduling is no longer based on channel conditions for wireless devices 302, 304, 306, 308, 310, 312, and 314. Thus, with a round robin scheduling algorithm, the first priority subset of wireless devices are scheduled at least as many wireless resource block transmissions as the second priority subset of wireless devices on a per wireless device basis (e.g., on average).

In other embodiments, the first and second scheduling algorithms may be different such that adjusting from the first scheduling algorithm to the second scheduling algorithm increases the number of resource blocks scheduled for transmission to the first priority subset of wireless devices. In an embodiment, the adjusted scheduling algorithm may be implemented for one or more of the cells or sectors of access node 318.

In some embodiments, the scheduling algorithm may be adjusted when it is detected that a number of resources blocks received by the second priority subset of wireless devices is greater than a number of resource blocks received by the first priority subset of wireless devices and when a number of wireless devices comprising the second priority subset of wireless devices meets a criteria. For example, the criteria may be an absolute threshold or a percentage (e.g., percentage threshold) relative to the number of wireless devices comprising the first priority subset of wireless devices. Here, the criteria comparison may consider whether the first priority subset of wireless devices will benefit from a change in scheduling algorithm. For instance, a change from proportional fairness to round robin may no longer take advantage of certain spectrum efficiencies. If a low number of wireless devices are in the second priority subset of wireless devices, it may be more beneficial to the first priority subset of wireless devices to merely continue using a proportional fairness scheduling algorithm, as the low number of second priority subset of wireless devices would not have an significant impact on the number of resource block transmissions to the first priority subset of wireless devices.

In an embodiment, the scheduling algorithm may be adjusted such that the resource blocks received by the first priority subset of wireless devices are increased after the adjustment when it is detected that that the second priority subset of wireless devices are receiving more resource block transmissions than the first priority subset of wireless devices or when it is detected that access node 316 (and scheduler 318) are scheduling more resource block transmissions to the second priority subset of wireless devices than to the first priority subset of wireless devices.

Figure 5:
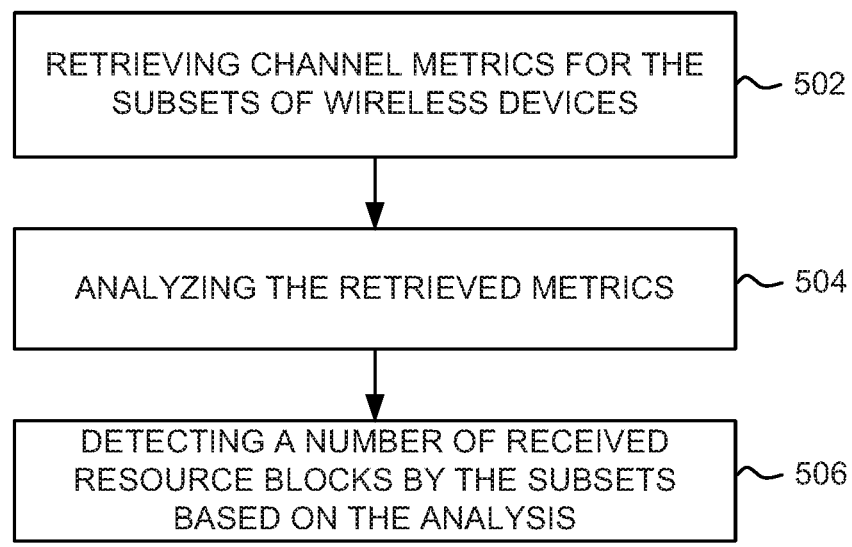
FIG. 5 illustrates an exemplary method for detecting conditions for adjusting a scheduling algorithm.

FIG. 5 illustrates an exemplary method for detecting conditions for adjusting a scheduling algorithm according to an embodiment. In an embodiment, the method of FIG. 5 may further describe step 406 of FIG. 4. The method will be discussed with reference to the exemplary communication system 300 illustrated in FIG. 3, however, the method can be implemented with any suitable communication system.

Referring to FIG. 5, at step 502, a plurality of channel metrics may be retrieved for the set of wireless devices. For example, wireless devices 302, 304, 306, 308, 310, 312, and 314 may comprise one or more Quality of Service Class Identifiers (QCIs) for the set's communication with access node 316. The one or more QCIs for each of the set of wireless devices may be retrieved. In an embodiment, a particular QCI (e.g., ranging from 1-9 for LTE implementations) may be associated with a predetermined set of wireless services (e.g., guaranteed or non-guaranteed bearer type, minimum data rate, packet delay, packet loss, and the like). In some embodiments, one or more QCIs may be associated with an application type. For example, video streaming may be best achieved with certain wireless services conditions, and thus a video streaming application may be associated with a QCI that provides these conditions. Other applications may be similarly associated with certain QCIs.

In another embodiment, wireless devices 302, 304, 306, 308, 310, 312, and 314 may report channel quality indicators (CQIs) for their communications with access node 316, and the reported CQIs may be retrieved. In other embodiments, other suitable metrics that indicate the channel quality for communication between access node 316 and each of the set of wireless devices may be used. For instance, other indicators based on a signal level for a signal received from access node 316 at each of the set of wireless devices may be implemented. In an embodiment, the signal level may comprise a Received Signal Strength Indicator (RSSI), Reference Signal Received Quality (RSRQ), Received Signal Received Power (RSRP), or any other suitable signal level.

At step 504, the retrieved metrics for the set of wireless devices may be analyzed. For example, one or more of CQIs and/or QCIs for wireless devices 302, 304, 306, 308, 310, 312, and 314 may be retrieved, and the retrieved metrics may be analyzed.

In an embodiment, wireless devices 306, 308, 310, 312, and 314 may comprise a first priority subset of wireless devices while wireless devices 302 and 304 may comprise a second priority subset of wireless devices, as described herein. In some examples, the QCIs assigned to a wireless device may be based on the priority of the subset for the wireless device. In an embodiment, wireless devices 302 and 304 may be labeled as heavy users, and are thus assigned to the second priority subset. In some instances, an application associated with a particular QCI may not be assigned the associated QCI when the application is running on a wireless device that is part of the second priority subset (e.g., a wireless device labeled as a heavy user). For example, a video streaming application may be assigned a first QCI when a wireless device that is labeled as a normal user executes the application (e.g., wireless device 306), but may be assigned a second QCI when a wireless device that is labeled as a heavy user executes the application (e.g., wireless device 302). In some embodiments, a set of QCIs may be assigned to (or reserved for) the first priority subset while another set of QCIs may be assigned to (or reserved for) the second priority subset. Thus, the QCI for a wireless device may be based on an application being executed (e.g., and associated application requirements) and the subset priority for the wireless device.

In an embodiment, analyzing the retrieved metrics may comprise comparing the retrieved CQIs for the set of wireless devices to one another. In another embodiment, analyzing the retrieved metrics may include monitoring data transmitted using QCIs assigned to (or reserved for) the first priority subset of wireless devices (e.g., normal users) and monitoring data transmitted over QCIs assigned to (or reserved for) the second priority subset of wireless devices (e.g., heavy users).

In an embodiment, analyzing the retrieved metrics may also comprise analyzing the retrieved CQIs from the set of wireless devices, and determining which QCIs may be assigned to the particular wireless device based on reported CQI and priority of the subset for the particular wireless device. Here, CQIs may be monitored and data traffic over a CQI may be associated with a wireless device from the first priority subset or the second priority subset based on the determined QCIs for the first priority subset and the second priority subset.

At step 506, it may be determined that the second priority subset of wireless devices are receiving more resource block transmissions than the first priority subset of wireless devices. The determination may be made based on the analyzed retrieved metrics for the set of wireless devices 302, 304, 306, 308, 310, 312, and 314.

In an embodiment, retrieved CQIs for the set of wireless devices may be compared to one another. For example, the retrieved CQIs for the first priority subset of wireless devices may be compared to the retrieved CQIs for the second priority subset of wireless devices. In FIG. 3, wireless devices 306, 308, 310, 312, and 314 are located at the edge of signal area 326 while wireless devices 302 and 304 are located near access node 316. Accordingly, the CQIs for the first priority subset of wireless devices (e.g., 306, 308, 310, and 312) may indicate poor channel conditions while the CQIs for the second priority subset of wireless devices (e.g., wireless devices 302 and 304) may indicate positive channel conditions. In such conditions, it may be predicted that the second priority subset of wireless devices are receiving more resource block transmissions from access node 316 than the first priority subset of wireless devices when the access node implements a scheduling algorithm that favors wireless devices with positive channel conditions (e.g., max C/I or proportional fairness). In an embodiment, when a difference between an average CQI for wireless devices of the first priority subset and an average CQI for wireless devices of the second priority subset meets a criteria (e.g., when the difference is greater than a threshold), it may be detected that the second priority subset of wireless devices are receiving more resource block transmissions than the first priority subset of wireless devices.

In some examples, the first priority subset of wireless devices may be weighted (e.g., by scheduler 318) such that they receive favorable scheduling over the second priority subset of wireless devices. For instance, the weighting may include assigning (or reserving) certain QCIs for the first priority subset (e.g., normal users) and other QCIs (e.g., that provide for a lower number of transmissions) for the second priority subset (e.g., heavy users). Other weighting techniques may also be implemented. In these examples, the criteria (or threshold) may be configured such that the weighting that prioritizes the first priority subset of wireless devices is accounted for in the comparison. In other words, the criteria (or threshold) may be configured such that a moderate difference between the retrieved QCIs for the first priority subset of wireless devices and the retrieved QCIs for the second priority subset of wireless devices triggers the detection that the second priority subset is receiving more resource block transmissions than the first priority subset. This is because, in these examples, a minimal difference may be overcome by the weighting, and thus the minimal difference may not indicate that that the second priority subset is receiving more resource block transmissions than the first priority subset.

In an embodiment, it may be detected that the number of resources blocks received by the second priority subset of wireless devices is greater than the number of resource blocks received by the first priority subset of wireless devices when a ratio of the retrieved CQIs for the first priority subset of wireless devices and the retrieved CQIs for the second priority subset of wireless devices meets a ratio criteria (e.g. exceeds a threshold). For example, a ratio that meets a criteria (e.g., exceeds a threshold) may indicate a large enough difference in signal quality between the first priority subset of wireless devices and the second priority subset of wireless devices that the detection may be triggered. In some examples, the ratio may comprise an average of retrieved CQIs for the first priority subset of wireless devices and an average of the retrieved CQIs for the second priority subset of wireless devices. In some embodiments where a weighting is used to prioritize scheduling to the first priority subset of wireless devices, the ratio criteria (e.g., threshold) may be configured to account for the weighting, similar to the criteria configuration described herein.

In another embodiment, monitored data over particular QCIs for the set of wireless devices may be compared to one another to detect that the second priority subset of wireless devices are receiving more resource block transmissions than the first priority subset of wireless devices. For example, particular QCIs may be associated with the first priority subset or the second priority subset based on CQIs reported by the set of wireless devices, QCIs assigned to (or reserved for) the first priority subset, and/or QCIs assigned to (or reserved for) the second priority subset. Based on the monitored data, it may be determined whether the second priority subset of wireless device is being scheduled more transmissions than the first priority subset of wireless devices when the monitored QCIs associated with the second priority subset carry more data than the monitored QCIs associated with the first priority subset.

In an embodiment, the detection that that the second priority subset of wireless devices are receiving more resource block transmissions than the first priority subset of wireless devices may also comprise detection that access node 316 (and scheduler 318) are scheduling more resource block transmissions to the second priority subset of wireless devices than to the first priority subset of wireless devices. For instance, the detection that access node 316 (and scheduler 318) are scheduling more resource block transmissions to the second priority subset of wireless devices than to the first priority subset of wireless devices may occur similar to the detection described with reference to FIG. 5. Once the detection occurs, the method of FIG. 4 may return to step 408.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
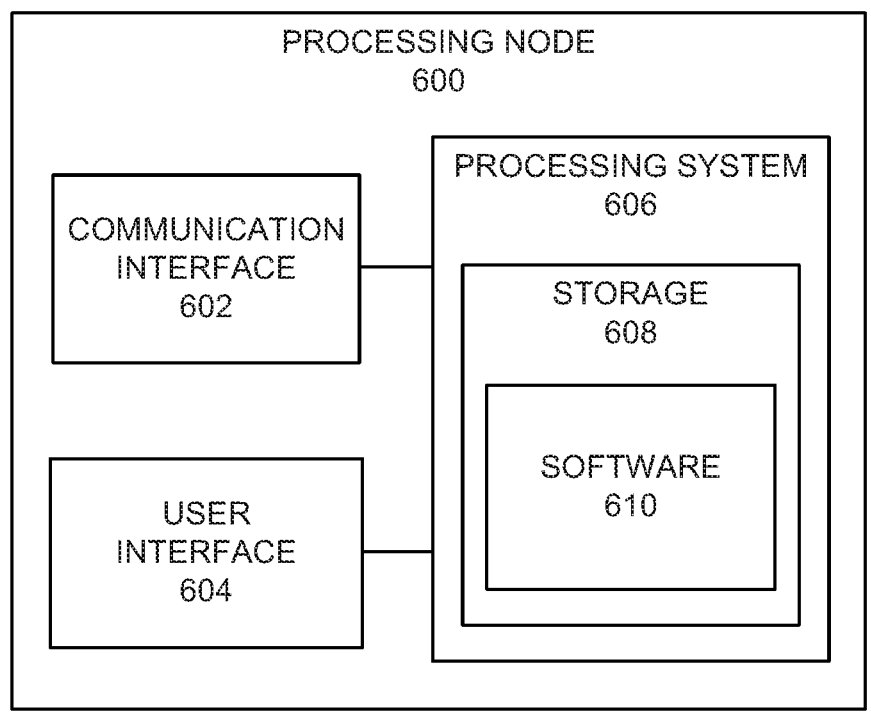
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 320 and gateway node 322. Processing node 600 can also be an adjunct or component of a network element, such as an element of access nodes 110 or 316 and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for adjusting a scheduling algorithm based on wireless device priority, the method comprising:
retrieving quality of service metrics for a set of wireless devices comprising a first priority subset of wireless devices and a second priority subset of wireless devices;
transmitting, from an access node, a plurality of resource blocks to the first priority subset and second priority subset using a first scheduling algorithm, wherein the first scheduling algorithm is based on the retrieved quality of service metrics for the first priority subset of wireless devices and the retrieved quality of service metrics for the second priority subset of wireless devices;

monitoring data communicated to the first priority subset of wireless devices and the second priority subset of wireless devices over a period of time using the first scheduling algorithm;

detecting:
- a number of resource blocks received by the second priority subset of wireless devices is greater than a number of resource blocks received by the first priority subset of wireless devices based on a comparison between the monitored data communicated using the first scheduling algorithm, and
- a first channel quality indicator for the first priority subset of wireless devices is less than a second channel quality indicator for the second priority subset of wireless devices; and changing from the first scheduling algorithm to a second scheduling algorithm, based on the detecting, such that the resource blocks received by the first priority subset of wireless devices are increased after the period of time.

2. The method of claim 1, wherein the second scheduling algorithm schedules the number of resource blocks received by a wireless device from among the first priority subset of wireless devices is at least equal to the number of resource received by a wireless device from among the second priority subset of wireless devices.

3. The method of claim 2, wherein the second scheduling algorithm is a round robin scheduling algorithm.

4. The method of claim 3, wherein the first scheduling algorithm is changed from a proportional fairness or maximum C/I algorithm.

5. The method of claim 1, wherein the number of resource blocks received by the second priority subset of wireless devices comprises an average number of resource blocks received and the number of resource blocks received by the second priority subset of wireless devices comprises the average number of resource blocks received.

6. The method of claim 1, wherein the first priority subset of wireless devices comprises a normal data user and the second priority subset of wireless devices comprises a heavy data user.

7. The method of claim 6, wherein the second priority subset of wireless devices are labeled as heavy data users based on an amount of data transmitted to each wireless device from among the second priority subset over the period of time.

8. The method of claim 1, wherein the quality of service metrics comprise quality of service class identifiers (QCIs).

9. The method of claim 1, wherein the retrieved quality of service metrics for the first priority subset of wireless devices are different from the retrieved quality of service metrics for the first priority subset of wireless devices.

10. A system for adjusting a scheduling algorithm based on wireless device priority, the system comprising:
an access node with a processor configured to:
retrieve quality of service metrics for a first priority subset of wireless devices and a second priority subset of wireless devices;
transmit a plurality of resource blocks to the first priority subset and second priority subset using a first scheduling algorithm, wherein the first scheduling algorithm is based on the retrieved quality of service metrics for the first priority subset of wireless devices and the retrieved quality of service metrics for the second priority subset of wireless devices;

monitor data communicated to the first priority subset of wireless devices and the second priority subset of wireless devices over a period of time using the first scheduling algorithm;

detect:
- a number of resource blocks received by the second priority subset of wireless devices is greater than a number of resource blocks received by the first priority subset of wireless devices based on a comparison between the monitored data communicated using the first scheduling algorithm, and
- a first channel quality indicator for the first priority subset of wireless devices is less than a second channel quality indicator for the second priority subset of wireless devices; and change from the first scheduling algorithm to a second scheduling algorithm, based on the detecting, such that the resource blocks received by the first priority subset of wireless devices are increased after the period of time.

11. The system of claim 10, wherein the second scheduling algorithm schedules the number of resource blocks received by a wireless device from among the first priority subset of wireless devices is at least equal to the number of resource received by a wireless device from among the second priority subset of wireless devices.

12. The system of claim 11, wherein the first scheduling algorithm is changed from a proportional fairness or maximum C/I algorithm to the second scheduling algorithm comprising a round robin.

13. The system of claim 10, wherein the number of resource blocks received by the second priority subset of wireless devices comprises an average number of resource blocks received and the number of resource blocks received by the second priority subset of wireless devices comprises the average number of resource blocks received.

14. The system of claim 10, wherein the first priority subset of wireless devices comprises a normal data user and the second priority subset of wireless devices comprises a heavy data user.

15. The system of claim 10, wherein the quality of service metrics comprise quality of service class identifiers (QCIs).

16. The system of claim 10, wherein the retrieved quality of service metrics for the first priority subset of wireless are different from the retrieved quality of service metrics for the first priority subset of wireless devices.

17. A method for adjusting a scheduling algorithm based on wireless device priority, the method comprising:
transmitting, from an access node, a plurality of resource blocks to a set of wireless devices using a first scheduling algorithm, wherein the set comprises a first priority subset of wireless devices and a second priority subset of wireless devices, and the first priority subset of wireless devices comprises a normal data user and the second priority subset of wireless devices; comprises a heavy data user;
retrieving channel quality indicators for the set of wireless devices;
detecting:
- a first channel quality indicator for the first priority subset of wireless devices is less than a second channel quality indicator for the second priority subset of wireless devices, and
- a number of resource blocks received by the second priority subset of wireless devices is greater than a number of resource blocks received by the first priority subset of wireless devices based on a comparison between the retrieved channel quality indicators for the first priority subset of wireless devices and the retrieved channel quality indicators for the second priority subset of wireless devices; and changing from the first scheduling algorithm to a second scheduling algorithm, based on the detecting, such that the resource blocks received by the first priority subset of wireless devices are increased after the adjustment.

18. The method of claim 17, wherein the second priority subset of wireless devices are labeled as heavy data users based on an amount of data transmitted to each wireless device from among the second priority subset over a period of time.

19. The method of claim 18, further comprising detecting that the number of resource blocks received by the second priority subset of wireless devices is greater than the number of resource blocks received by the first priority subset of wireless devices when a ratio of the retrieved channel quality indicators for the first priority subset of wireless devices and the retrieved channel quality indicators for the second priority subset of wireless devices meets a ratio criteria.

20. The method of claim 19, wherein the ratio comprises an average of the retrieved channel quality indicators for the first priority subset of wireless devices and an average of the retrieved channel quality indicators for the second priority subset of wireless devices.

* * * * *